United States Patent
Furusawa et al.

(10) Patent No.: US 11,485,229 B2
(45) Date of Patent: Nov. 1, 2022

(54) HEAD-UP DISPLAY

(71) Applicant: NIPPON SEIKI CO., LTD., Niigata (JP)

(72) Inventors: Hiroyuki Furusawa, Niigata (JP); Kazuaki Mizuta, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 305 days.

(21) Appl. No.: 16/761,654

(22) PCT Filed: Nov. 26, 2018

(86) PCT No.: PCT/JP2018/043318
§ 371 (c)(1),
(2) Date: May 5, 2020

(87) PCT Pub. No.: WO2019/107294
PCT Pub. Date: Jun. 6, 2019

(65) Prior Publication Data
US 2021/0162864 A1    Jun. 3, 2021

(30) Foreign Application Priority Data

Nov. 30, 2017    (JP) .............................. JP2017-230843

(51) Int. Cl.
*B60K 35/00*    (2006.01)
*G02B 27/01*    (2006.01)
*B60R 11/02*    (2006.01)

(52) U.S. Cl.
CPC .............. *B60K 35/00* (2013.01); *B60R 11/02* (2013.01); *G02B 27/0101* (2013.01); *B60K 2370/1529* (2019.05)

(58) Field of Classification Search
CPC ...... B60K 35/00; B60R 11/02; G02B 27/0101
See application file for complete search history.

(56) References Cited

U.S. PATENT DOCUMENTS

| | | | |
|---|---|---|---|
| 2009/0231698 A1 | 9/2009 | Hashimoto et al. | |
| 2014/0022645 A1* | 1/2014 | Matsuura | G02B 3/0006 |
| | | | 359/626 |

(Continued)

FOREIGN PATENT DOCUMENTS

| | | |
|---|---|---|
| JP | 2014-021391 A | 2/2014 |
| JP | 2016-159779 A | 9/2016 |

(Continued)

OTHER PUBLICATIONS

International Search Report issued in corresponding International Patent Application No. PCT/JP2018/043318, dated Feb. 12, 2019, with English translation.

*Primary Examiner* — Elmito Breval
*Assistant Examiner* — Nathaniel J Lee
(74) *Attorney, Agent, or Firm* — McDermott Will & Emery LLP (57) ABSTRACT

In order to provide a head-up display that is capable of reliably displaying a display image, the present invention is provided with: a display device that projects display light; a field lens that adjusts the direction of the display light; a thin-plate screen that has a rear surface for receiving the light emitted from the field lens and a front surface on which a display image is displayed; a screen holder that holds the screen; and a main holder that accommodates the field lens and the screen held by the screen holder.

6 Claims, 7 Drawing Sheets

(56) References Cited

U.S. PATENT DOCUMENTS

2014/0368544 A1* 12/2014 Kobayashi ......... G02B 27/0101
                                                      345/633
2017/0212347 A1    7/2017  Uragami et al.
2018/0210200 A1    7/2018  Matsuura et al.

FOREIGN PATENT DOCUMENTS

| JP | 2017-021302 A | 1/2017 |
| JP | 2017-032600 A | 2/2017 |
| JP | 2017-116888 A | 6/2017 |
| JP | 2017-134384 A | 8/2017 |
| WO | 2007/049664 A1 | 5/2007 |

* cited by examiner

HEAD-UP DISPLAY

CROSS REFERENCE

This application is the U.S. National Phase under 35 U.S.C. § 371 of International Application No. PCT/JP2018/043318, filed on Nov. 26, 2018, which claims the benefit of Japanese Application No. 2017-230843, filed on Nov. 30, 2017, the entire contents of each are hereby incorporated by reference.

TECHNICAL FIELD

The present invention relates to a head-up display to be mounted on a vehicle or the like.

BACKGROUND ART

A head-up display is mounted on a vehicle, and displays, via a transmission-reflection portion such as a windshield, a virtual image of various information such as information necessary for a driver during driving. Thus, the head-up display can display information (an image) superimposed on a scene in front of the vehicle. The driver can grasp necessary information without a large movement of his/her line of sight during driving.

Display light for displaying an image is generated by a projection display device, for example. After a direction of the generated display light is adjusted by a field lens, the generated display light is displayed as an image on a screen (see, for example, Patent Document 1).

PRIOR ART DOCUMENT

Patent Document

Patent Document 1: Japanese Unexamined Patent Application Publication No. 2017-21302

SUMMARY OF THE INVENTION

Problems to be Solved by the Invention

A head-up display is mounted on a vehicle, and thus, is used in a vibrating environment. Therefore, it is necessary to hold the screen and the field lens with as little vibration as possible to accurately display information as an image.

The present invention has been made in view of these circumstances, and an object thereof is to provide a head-up display capable of reliably displaying a display image.

Solution to Problem

To solve the problem described above, a head-up display according to the present invention includes: a display device configured to project display light; a field lens configured to adjust a direction of the display light; a thin-plate screen configured to receive the display light emitted from the field lens on a rear surface and display a display image on a front surface; a screen holder configured to hold the screen; and a main holder configured to accommodate the field lens and the screen held by the screen holder.

Effect of the Invention

In the head-up display according to the present invention, a display image can be reliably displayed.

MODE FOR CARRYING OUT THE INVENTION

An embodiment of a head-up display according to the present invention will be described with reference to the accompanying drawings. The head-up display according to the present invention is mounted on a vehicle such as an automobile. In the present embodiment, an example in which the head-up display according to the present invention is mounted on an automobile will be described.

Figure 1:
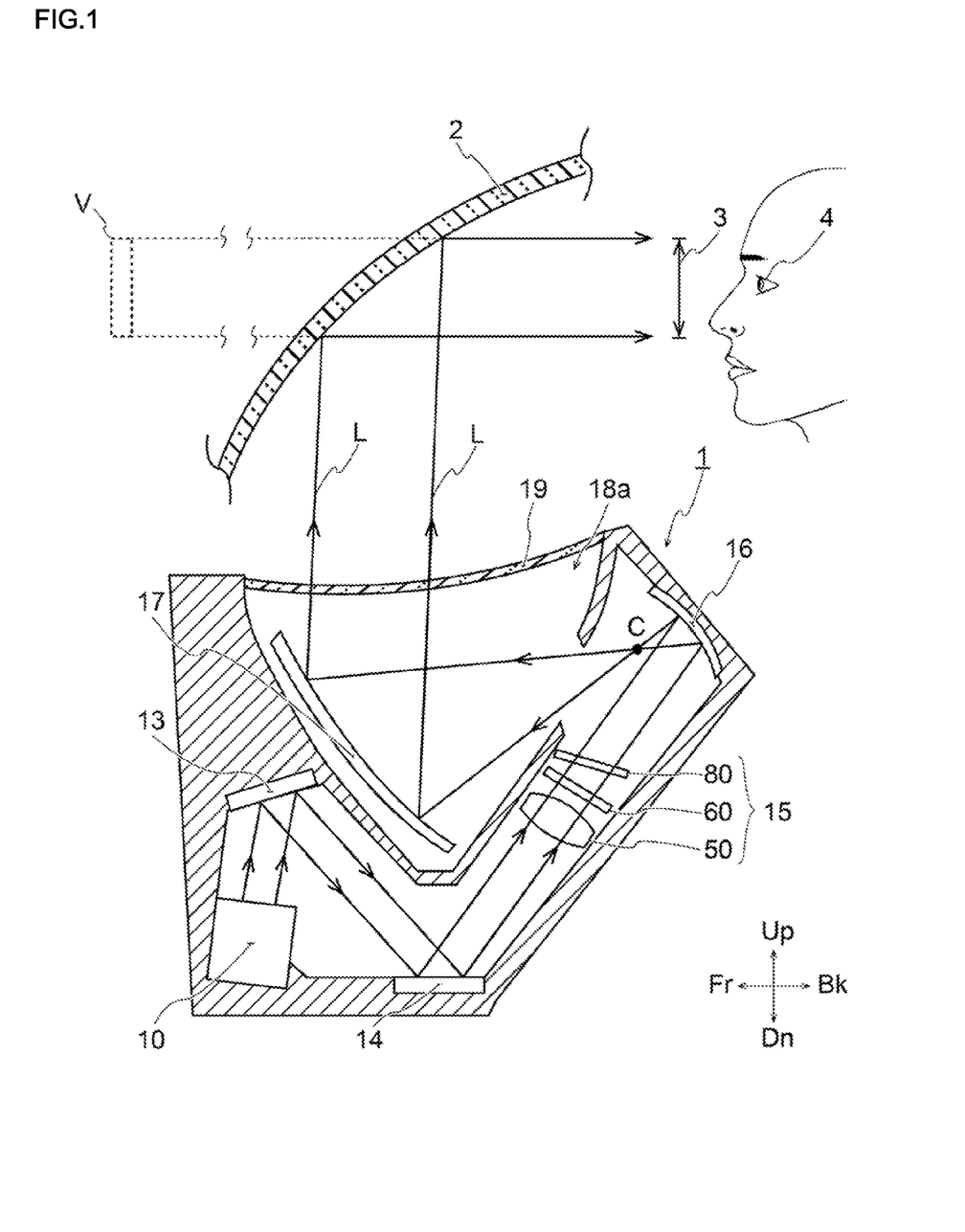
FIG. 1 is an explanatory diagram illustrating an embodiment of a head-up display according to the present invention, and in particular, a configuration of an optical system.

FIG. 1 is an explanatory diagram illustrating an embodiment of the head-up display according to the present invention, and in particular, a configuration of an optical system.

A head-up display 1 (hereinafter, referred to as HUD 1) is arranged in an instrument panel of an automobile. The HUD 1 mainly includes a projection display device 10, a first plane mirror 13, a second plane mirror 14, a screen unit 15, a first concave mirror 16, a second concave mirror 17, and a case 18. The HUD 1 reflects display light L which represents a display image (image) and is generated by the projection display device 10, on the first and second plane mirrors 13 and 14 and the first and second concave mirrors 16 and 17 and emits the display light L toward a windshield 2 of an automobile, which is an example of a transmission-reflection unit. The first and second plane mirrors 13 and 14 and the first and second concave mirrors 16 and 17 form a relay optical system. If placing a viewpoint 4 in an eye box 3 being an image visible region generated by the HUD 1, a viewer (mainly a driver) can visually recognize a virtual image V of the display image superimposed on the scene (real scene) in front of the vehicle.

The projection display device 10 (display device 10) generates and projects the display light L relating to the display image.

The first plane mirror 13 reflects the display light L generated and projected by the display device 10. The second plane mirror 14 further reflects the display light L reflected by the first plane mirror 13.

The screen unit 15 receives the display light L reflected by the second plane mirror 14 and displays an image (real image). Details of the screen unit 15 will be described later.

The first concave mirror 16 has a curvature (reciprocal of the radius) that causes the display light L emitted from the screen unit 15 to cross up and down (cross at a cross point C) before the display light L reaches the second concave mirror 17, and reflects the display light toward the second concave mirror 17. The second concave mirror 17 reflects the display light L reflected by the first concave mirror 16 toward the windshield 2.

The case 18 houses the display device 10, the first and second plane mirrors 13 and 14, the screen unit 15, and the first and second concave mirrors 16 and 17. The case 18 has an opening 18a at a portion facing the windshield 2. The opening 18a is covered by a light transmissive cover 19 being light transmissive. The display light L reflected by the second concave mirror 17 passes through the light transmissive cover 19 and is emitted from the HUD 1.

Figure 2:
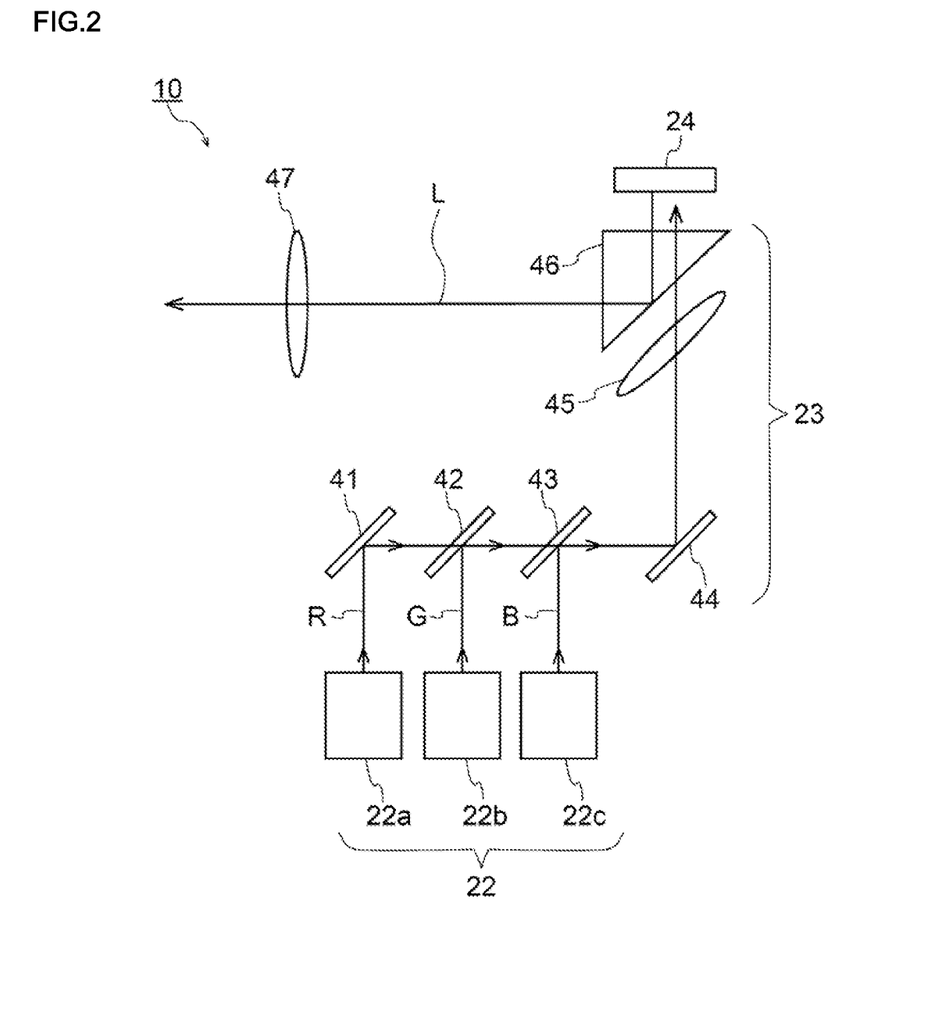
FIG. 2 is an explanatory diagram illustrating a configuration of an optical system of a display device.

FIG. 2 is an explanatory diagram illustrating a configuration of an optical system of the display device 10.

The display device 10 mainly includes a light source 22, an optical member 23, and a light modulation element 24.

The light source 22 is a light emitting diode (LED) mounted on a substrate. The light source 22 includes a red light source 22a configured to emit a red light beam R, a green light source 22b configured to emit a green light beam G, and a blue light source 22c configured to emit a blue light beam B. Hereinafter, in a context in which the red light source 22a, the green light source 22b, and the blue light source 22c are not distinguished, they are simply referred to as the light source 22.

The optical member 23 includes a mirror 41, dichroic mirrors 42 and 43, a reflection mirror 44, a convex lens 45, a prism 46, and a light projection lens 47.

The red light beam R emitted from the red light source 22a is reflected by the mirror 41 and passes through the dichroic mirrors 42 and 43. The green light beam G emitted from the green light source 22b is reflected by the dichroic mirror 42 and passes through the dichroic mirror 43. The blue light beam B emitted from the blue light source 22c is reflected by the dichroic mirror 43. The light beams R, G, and B are reflected by the reflection mirror 44, distributed by the convex lens 45, and transmitted through the prism 46. The transmitted light beams R, G, and B are converted into the display light L by the light modulation element 24. The display light L is reflected by the prism 46, transmitted through the light projection lens 47, and projected (emitted).

The light modulation element 24 is a reflective display element such as a Digital Mirror Device (DMD) or a Liquid Crystal On Silicon (LCOS). The light modulation element 24 is connected to a control substrate (not illustrated) and is controlled by the control substrate.

Figure 3:
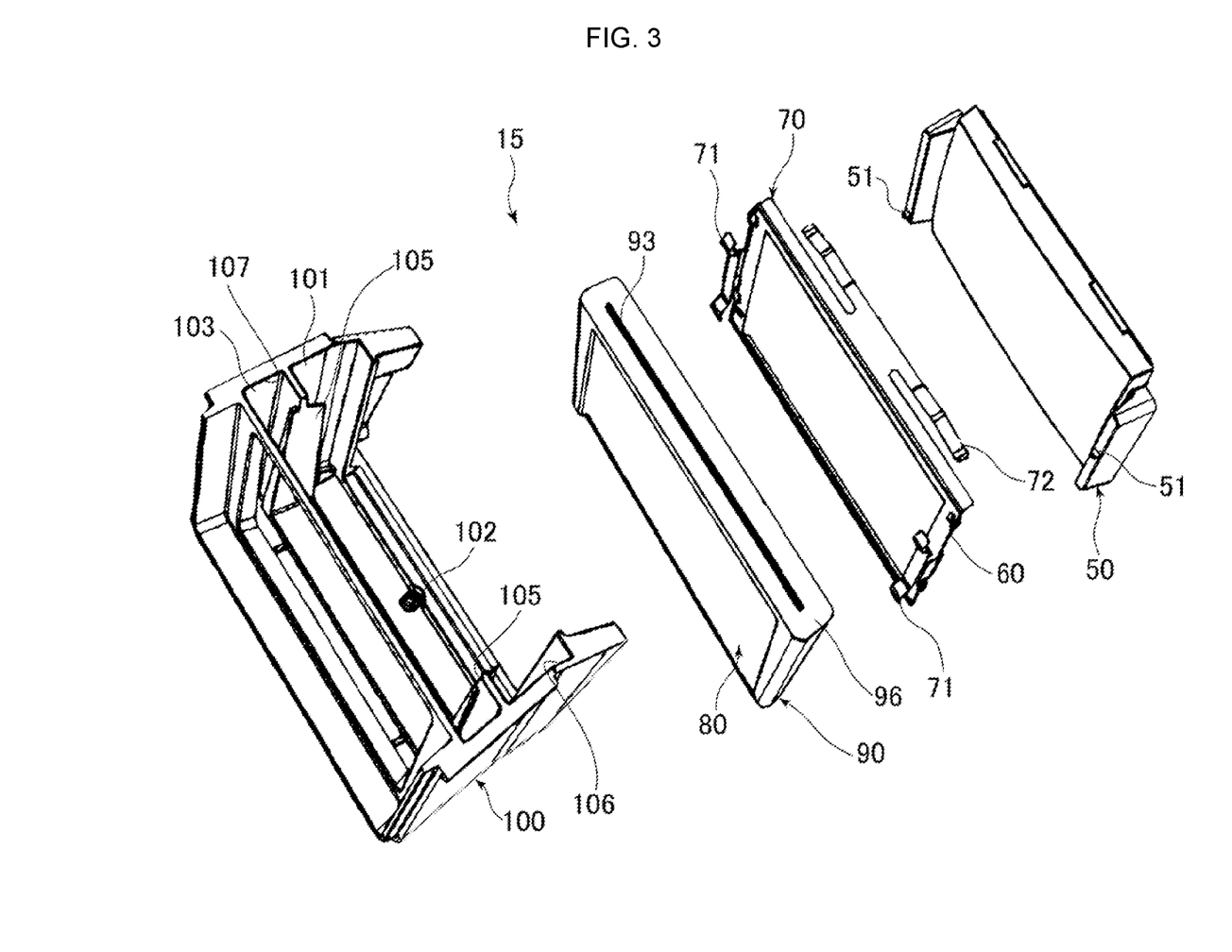
FIG. 3 is an exploded perspective view of a screen unit.

FIG. 3 is an exploded perspective view of the screen unit 15.

Figure 4A:
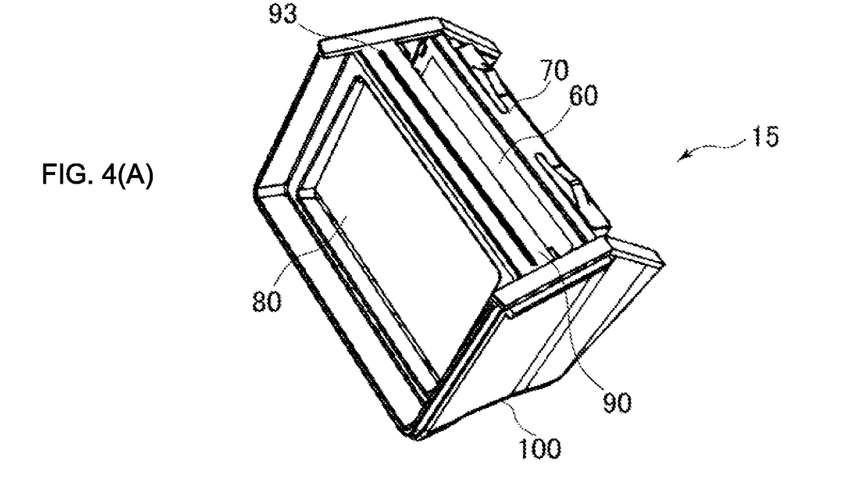
FIG. 4(A) is a perspective view of the screen unit.
Figure 4B:
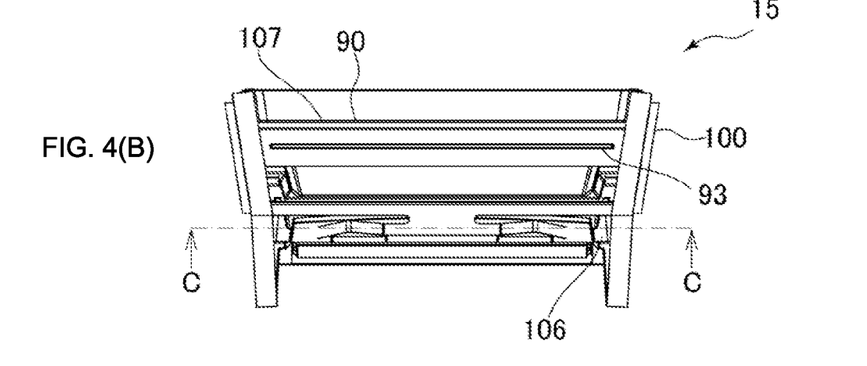
FIG. 4(B) illustrates the screen unit viewed from a side of an accommodation opening of a main holder.
Figure 4C:
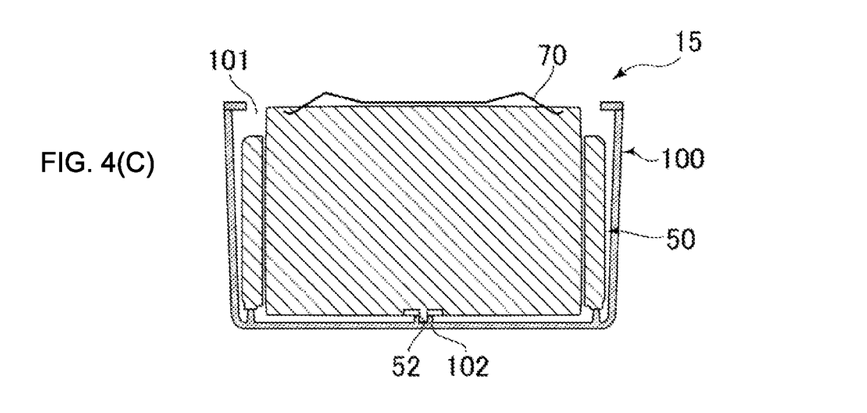
FIG. 4(C) is a cross-sectional view taken along a line C-C in FIG. 4(B).

FIG. 4(A) is a perspective view of the screen unit 15, FIG. 4(B) illustrates the screen unit 15 viewed from a side of accommodation openings 106 and 107 of a main holder 100, and FIG. 4(C) is a cross-sectional view taken along a line C-C in FIG. 4(B).

Figure 5A:
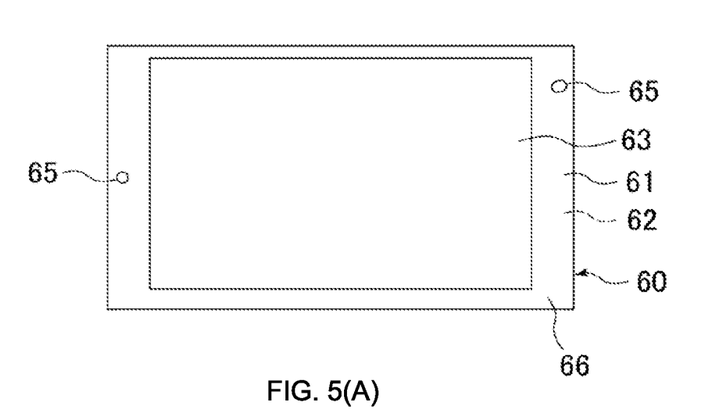
FIG. 5(A) is a plan view illustrating an appearance of a screen.
Figure 5B:
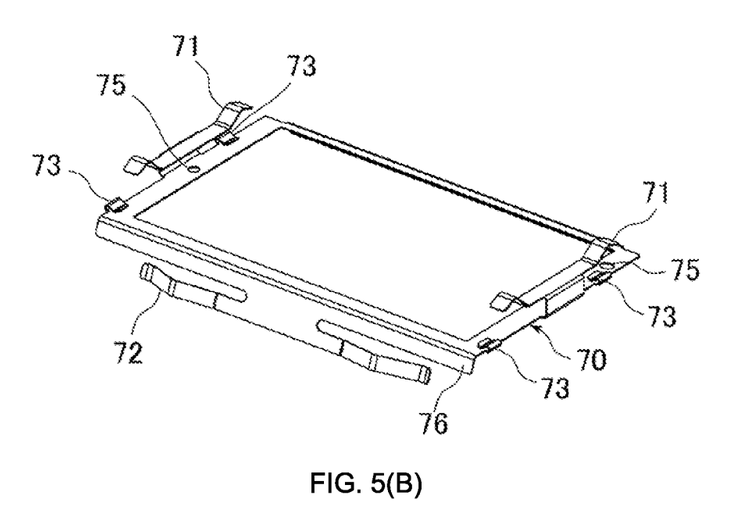
FIG. 5(B) is a perspective view illustrating a screen holder.

FIG. 5(A) is a front view illustrating an appearance of a screen 60, and FIG. 5(B) is a perspective view illustrating a screen holder 70.

Figure 6A:
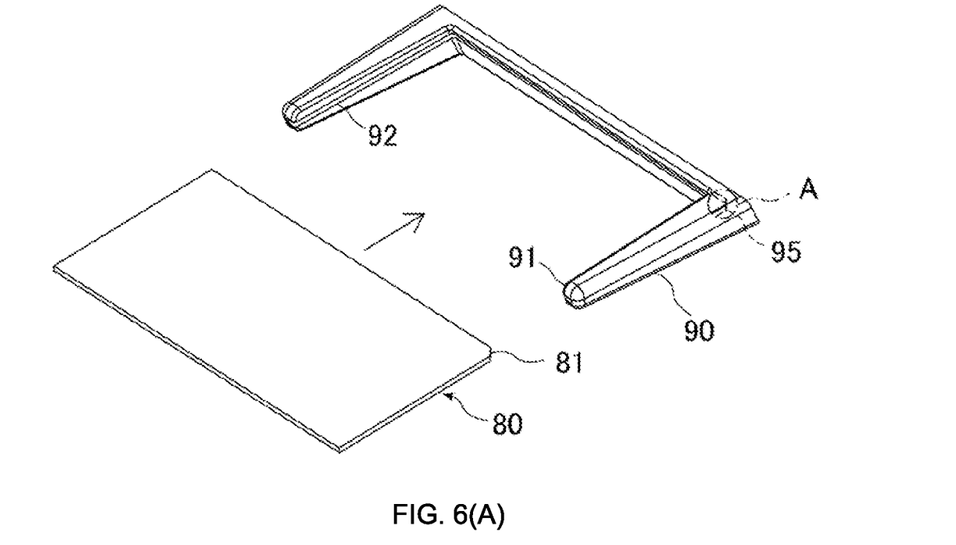
FIG. 6(A) is a perspective view illustrating an appearance of a hot mirror and a hot mirror packing.
Figure 6B:
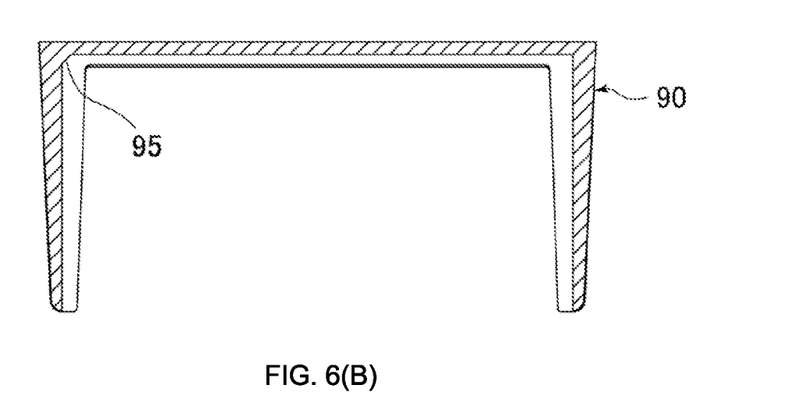
FIG. 6(B) is a cross-sectional view of the hot mirror packing.

FIG. 6(A) is a perspective view illustrating an appearance of a hot mirror 80 and a hot mirror packing 90, and FIG. 6(B) is a cross-sectional view of the hot mirror packing 90.

Figure 7:
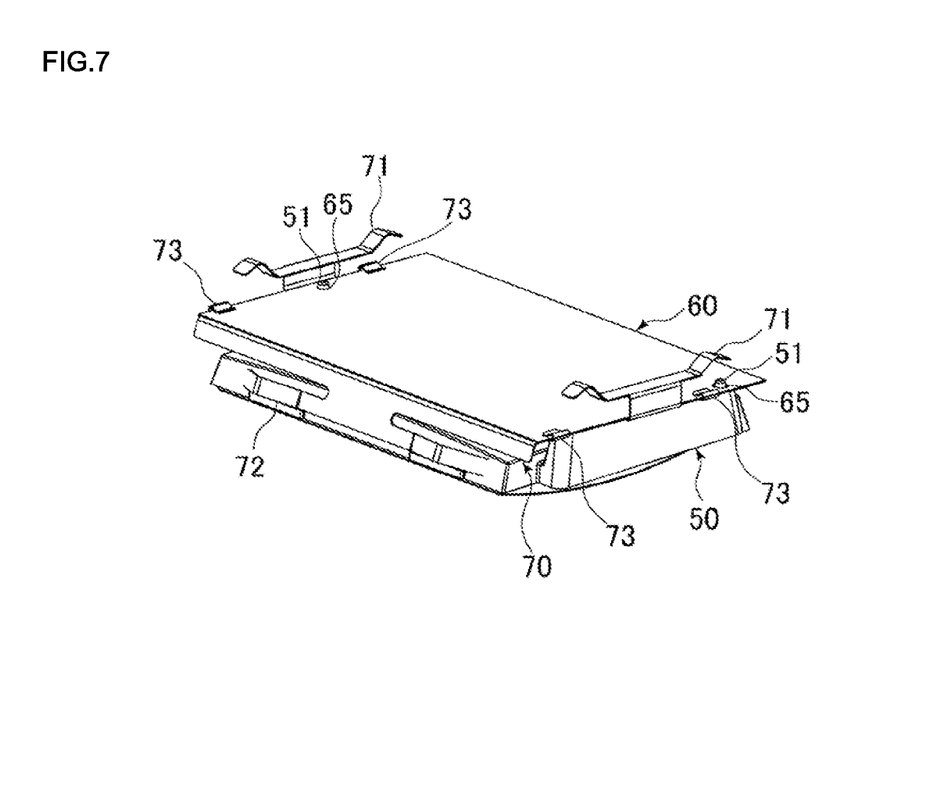
FIG. 7 is a perspective view illustrating a state where a field lens, the screen and the screen holder are assembled.

FIG. 7 is a perspective view illustrating a state where a field lens 50, the screen 60 and the screen holder 70 are assembled.

Figure 8A:
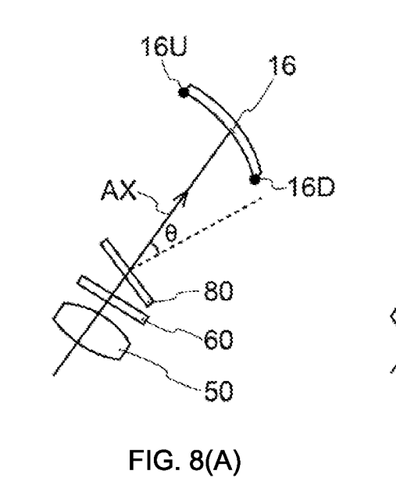
FIG. 8(A) and FIG. 8(B) are explanatory diagrams illustrating a positional relationship of the field lens, the screen, and the hot mirror.
Figure 8B:
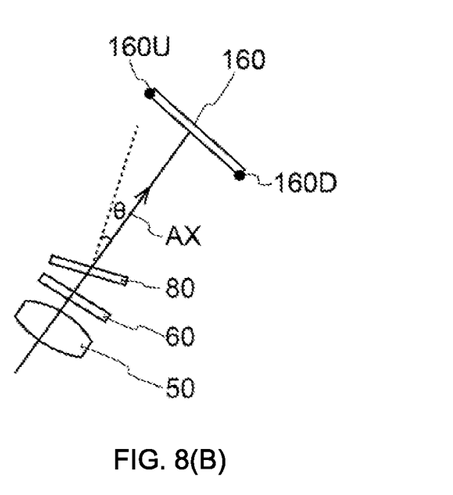

FIG. 8(A) and FIG. 8(B) are explanatory diagrams for explaining a positional relationship of the field lens 50, the screen 60, and the hot mirror 80. FIG. 8(A) is an explanatory diagram illustrating a positional relationship of the field lens 50, the screen 60, and the hot mirror 80 with respect to the first concave mirror 16, and FIG. 8(B) is an explanatory diagram illustrating a positional relationship of the hot mirror 80 in a case where the first concave mirror 16 is replaced with a third plane mirror 160.

The screen unit 15 includes the field lens 50, the screen 60, the screen holder 70, the hot mirror 80, the hot mirror packing 90, and the main holder 100.

The field lens 50 adjusts a direction of the display light L. That is, the field lens 50 has a function of guiding the display light L to the screen 60 at a predetermined distribution angle. The field lens 50 includes screen positioning pins 51 and a main holder positioning pin 52.

The screen positioning pins 51 (positioning members) position and fix with respect to the screen holder 70 and the screen 60. The screen positioning pins 51 include two screen positioning pins 51. The two screen positioning pins 51 are provided asymmetrically (on a diagonal line) so that the screen 60 and the screen holder 70 are not attached to the field lens 50 with a front surface 62 and a rear surface 61 of the screen 60 reversed. That is, one of the screen positioning pins 51 is provided at a center in a short direction, and the other of the screen positioning pins 51 is provided near an end part in the short direction. The main holder positioning pin 52 is provided on a side located on an inner side in an insertion direction if the main holder positioning pin 52 is accommodated in the main holder 100.

The screen 60 receives the display light L emitted from the field lens 50 on the rear surface 61 and displays a display image on the front surface 62. The screen 60 is formed of, for example, a polycarbonate resin, has a thin plate shape, and is flexible. The screen 60 includes a microlens array surface 63 and positioning holes 65. The microlens array surface 63 is a surface on which a plurality of convex microlenses provided on a base 66 are arranged, and is provided on the side of the rear surface 61 of the screen 60. The positioning holes 65 are positioned and fixed if the screen positioning pins 51 of the field lens 50 penetrates through the positioning holes 65. The positioning holes 65 are provided at positions corresponding to the screen positioning pins 51 of the field lens 50.

The screen holder 70 is formed of a thin metal plate, and holds the screen 60. The screen holder 70 includes a front-surface plate spring 71, a side-surface plate spring 72, a clip 73, and positioning holes 75.

The front-surface plate spring 71 (front-surface buffer member) is provided to face the front surface 62 of the screen 60 to abut against the main holder 100 in a direction orthogonal to the surface of the screen 60. The front-surface plate spring 71 buffers vibration of the screen 60 in a vertical direction (substantially in the vertical direction in FIG. 1) resulting from vibration of the vehicle. That is, the front-surface plate spring 71 buffers a contact with the main holder 100 resulting from the vibration of the screen 60 in the vertical direction.

The side-surface plate spring 72 (side-surface buffer member) is provided on a side surface 76 exposed from the main holder 100 (see FIG. 5(B)). The side-surface plate spring 72 is provided to abut against another structure such as the case 18 in the HUD 1. The side-surface plate spring 72 buffers vibration of the screen 60 in a horizontal direction (substantially in a left-right direction in FIG. 1 and in a front-back direction of a paper face of FIG. 1) resulting from vibration of the vehicle.

The clip 73 fixes the screen 60. The clip 73 includes four clips 73 sandwiching and fixing the screen 60 in the vicinity of the four corners of the screen 60.

The positioning holes 75 are positioned and fixed when the screen positioning pins 51 of the field lens 50 penetrates through the positioning holes 75. The positioning holes 75 are provided at positions corresponding to the screen positioning pins 51.

The hot mirror 80 transmits the display image displayed on the screen 60 and reflects (and absorbs) infrared light. The hot mirror 80 includes one chamfered hot mirror-side corner part 81. If being held by the hot mirror packing 90, the hot mirror-side corner part 81 is located on the inner side in the insertion direction.

The hot mirror packing 90 holds the hot mirror 80. The hot mirror packing 90 is a black member made of ethylene propylene diene rubber (EPDM), for example. Further, as illustrated in FIG. 6(A) and FIG. 6(B), the hot mirror packing 90 is a U-shaped frame member including an insertion opening 91 on one side for inserting the hot mirror 80. The hot mirror packing 90 includes a slit 92 and a convex-shaped part 93.

The slit 92 is provided on an inner peripheral side of the hot mirror packing 90, and the hot mirror 80 is inserted into and held by the slit 92. As illustrated in a region A of FIG. 6(A) and in FIG. 6(B), the slit 92 includes, at a position corresponding to the hot mirror-side corner part 81, a packing-side corner part 95 chamfered to fit with the hot mirror-side corner part 81.

The convex-shaped part 93 is provided on a side surface 96 of the hot mirror packing 90 exposed from the main holder 100. The convex-shaped part 93 is provided to abut against another structure such as the case 18 in the HUD 1, similarly to the side-surface plate spring 72 of the screen holder 70. The convex-shaped part 93 buffers vibration of the hot mirror 80 in the horizontal direction resulting from vibration of the vehicle.

As illustrated in FIG. 6(A), the thickness of the hot mirror packing 90 differs in the insertion direction. The thickness of the hot mirror packing 90, the inclination of the slit 92, and the accommodation angle of a hot mirror accommodation part 103 of the main holder 100 described later are suitably set, so that the surface of the hot mirror 80 inclined at a predetermined angle with respect to the surface of the screen 60 can be held.

The main holder 100 is a metal housing made of, for example, a magnesium alloy and accommodates the field lens 50, the screen 60 held by the screen holder 70, and the hot mirror 80 held by the hot mirror packing 90. The main holder 100 includes a lens accommodation part 101, the hot mirror accommodation part 103, and a shielding wall 105.

The lens accommodation part 101 accommodates the field lens 50 fixed to the screen holder 70 and the screen 60 from the accommodation opening 106. The lens accommodation part 101 includes a positioning hole 102 corresponding to the main holder positioning pin 52 of the field lens 50. The hot mirror accommodation part 103 accommodates the hot mirror 80 held by the hot mirror packing 90 from the accommodation opening 107. The shielding wall 105 shields the screen holder 70 so that the screen holder 70 accommodated in the lens accommodation part 101 is not visually recognized from the side of the hot mirror 80 or is not exposed to the side of the hot mirror 80. This prevents the metal screen holder 70 from being reflected by external light and prevents the display image from not being appropriately displayed.

Next, a procedure for assembling the screen unit 15 will be described.

In a first step, the screen 60 is inserted into the clips 73 of the screen holder 70. At this time, the screen 60 is inserted into the clips 73 so that the positioning holes 65 of the screen 60 and the positioning holes 75 of the screen holder 70 align with each other. In a second step, as illustrated in FIG. 7, the field lens 50 is attached to the screen 60 and the screen holder 70. At this time, the screen positioning pins 51 of the field lens 50 are attached to be reliably inserted into the positioning holes 65 and 75. The two sets of positioning holes 65 and 75 and screen positioning pins 51 are provided asymmetrically, and thus, it is possible to prevent the front surface 62 and the rear surface 61 of the screen 60 from being assembled improperly.

In a third step, as illustrated in FIG. 6(A), the hot mirror 80 is inserted from the insertion opening 91 along the slit 92 into the hot mirror packing 90. At this time, the hot mirror 80 is inserted so that the chamfered hot mirror-side corner part 81 is on the inner side in the insertion direction and coincides with the position of the packing-side corner part 95. This prevents the front surface and the rear surface of the hot mirror 80 from being assembled improperly. In a fourth step, the field lens 50 is accommodated in the lens accommodation part 101 of the main holder 100. At this time, as illustrated in FIG. 4(C), the main holder positioning pin 52 of the field lens 50 is reliably inserted into the positioning hole 102 of the main holder 100. Thus, the field lens 50 and the screen 60 integrated with the field lens 50 are simultaneously positioned with respect to the main holder 100.

In a fifth step, the hot mirror 80 is accommodated in the hot mirror accommodation part 103 of the main holder 100. It is noted that the hot mirror 80 is inserted from the side of the insertion opening 91 of the hot mirror packing 90, into the accommodation opening 107.

The screen unit 15 is assembled into the state illustrated in FIG. 4(A) to FIG. 4(C) through the above steps.

Description proceeds referring to FIG. 8(A) and FIG. 8(B). As illustrated in FIG. 8(A), the hot mirror 80 is arranged in a state in which the hot mirror 80 is inclined by the hot mirror packing 90 at an angle θ with respect to an optical axis AX of the display light L passing through the field lens 50 and the screen 60 to face a lower-side end 16D of the first concave mirror 16. This prevents the display light L reflected on the back surface of the hot mirror 80 after passing through the screen 60 from moving again toward the first concave mirror 16, and thus, the display light L is unlikely to turn into stray light.

Further, as illustrated in FIG. 8(B), if the first concave mirror 16 is replaced by the third plane mirror 160, it is preferable that the hot mirror 80 is inclined at an angle θ with respect to the optical axis AX of the display light L passing through the field lens 50 and the screen 60 to face an upper-side end 160U of the third plane mirror 16. This provides the display light L reflected on the back surface of the hot mirror 80 after passing through the screen 60 from moving again toward the third plane mirror 160, and, and thus, the display light L is unlikely to turn into stray light. That is, it is preferable that an orientation in which the hot mirror 80 is inclined is reversed, depending on whether the concave mirror (the first concave mirror 16) or the plane mirror (the third plane mirror 160) is employed.

The HUD 1 according to the present embodiment includes the screen unit 15 described above, and thus, the display image can be appropriately displayed. That is, the screen 60 is reliably held by the screen holder 70, and thus, it is possible to prevent an inappropriate image from being displayed to a viewer due to vibration or bending of the screen 60. In particular, the front-surface plate spring 71 and the side-surface plate spring 72 are provided to reduce vibration of the screen 60 resulting from vibration of the vehicle, and thus, a more appropriate image can be displayed.

Further, the screen holder 70 is provided, and thus, the screen 60 made of resin does not directly contact the main holder 100 made of metal. Therefore, it is possible to avoid a situation where parts of the screen 60 are chipped off due to friction with the main holder 100, the chipped-off powder adheres to the screen 60, and the display image is not appropriately displayed. That is, the screen holder 70 is made of metal, similarly to the main holder 100, and thus, the screen holder 70 does not experience chipping from friction.

Further, the screen 60 fixed to the screen holder 70 and the field lens 50 are assembled to form one member, and then attached to the main holder 100. Therefore, assembling errors can be reduced as compared with a case where the screen 60 and the field lens 50 are positioned separately in the main holder 100.

Although some embodiments of the present invention have been described, these embodiments are presented by way of example and are not intended to limit the scope of the invention. These novel embodiments can be implemented in various other forms, and various omissions, replacements, and changes can be made without departing from the scope of the invention. These embodiments and modifications thereof are included in the scope and gist of the invention, and are included in the invention described in the claims and the equivalents thereof.

DESCRIPTION OF REFERENCE NUMERALS

1 Head-up display (HUD)
2 Windshield
3 Eye box
4 Viewpoint
10 Projection display device (display device)
13 First plane mirror
14 Second plane mirror
15 Screen unit
16 First concave mirror
17 Second concave mirror
18 Case
18a Opening
19 Light transmissive cover
22 Light source
22a Red light source
22b Green light source
22c Blue light source
23 Optical member
24 Light modulation element
41 Mirror
42, 43 Dichroic mirror
44 Reflection mirror
45 Convex lens
46 Prism
47 Light projection lens
50 Field lens
51 Screen positioning pin
52 Main holder positioning pin
60 Screen
61 Rear surface
62 Front surface
63 Microlens array surface
65, 75, 102 Positioning hole
66 Base
70 Screen holder
71 Front-surface plate spring
72 Side-surface plate spring
73 Clip
76, 96 Side surface
80 Hot mirror
81 Hot mirror-side corner part
90 Hot mirror packing
91 Insertion opening
92 Slit
93 convex-shaped part
95 Packing-side corner part
100 Main holder
101 Lens accommodation part
103 Hot mirror accommodation part
105 Shielding wall
106, 107 Accommodation opening

The invention claimed is:

1. A head-up display comprising:
a display device configured to project display light;
a thin-plate screen configured to receive the projected display light on a rear surface of the thin-plate screen and display a display image on a front surface of the thin-plate screen;
a screen holder configured to hold the thin-plate screen; and
a main holder configured to accommodate the screen held by the screen holder,
wherein the screen holder includes a front-surface buffer member abutting against the main holder on a side of the front surface of the thin-plate screen in a direction orthogonal to a surface of the thin-plate screen, the front-surface buffer member being configured to buffer vibration of the thin-plate screen with respect to the main holder.

2. The head-up display according to claim 1, wherein the screen holder includes a plurality of clips configured to fix the screen.

3. The head-up display according to claim 1, wherein the screen holder includes a side surface exposed from the main holder, and a side-surface buffer member provided on the side surface, the side-surface buffer member being configured to buffer vibration of the thin-plate screen.

4. A head-up display comprising:
a display device configured to project display light;
a thin-plate screen configured to receive the projected display light on a rear surface of the thin-plate screen and display a display image on a front surface of the thin-plate screen;
a screen holder configured to hold the thin-plate screen; and
a main holder configured to accommodate the screen held by the screen holder,
wherein the screen holder includes a side surface exposed from the main holder, and a side-surface buffer member provided on the side surface, the side-surface buffer member being configured to buffer vibration of the thin-plate screen.

5. The head-up display according to claim 4, wherein the screen holder includes a plurality of clips configured to fix the screen.

6. A head-up display comprising:
a display device configured to project display light;
a field lens configured to adjust a direction of the display light;
a thin-plate screen configured to receive the display light emitted from the field lens on a rear surface of the thin-plate screen and display a display image on a front surface of the thin-plate screen;

a screen holder configured to hold the thin-plate screen; and a main holder configured to accommodate the field lens and the screen held by the screen holder, wherein the field lens includes a positioning member configured to position and fix the screen holder and the thin-plate screen held by the screen holder, and the main holder includes a lens accommodation unit configured to accommodate the field lens fixed to the screen holder and the thin-plate screen.

* * * * *